United States Patent [19]

Song

[11] Patent Number: 4,519,644
[45] Date of Patent: May 28, 1985

[54] FOLDABLE VEHICLE COVER STORABLE ON THE VEHICLE

[76] Inventor: Sung T. Song, 1911 Gardena Ave., Glendale, Calif. 91204

[21] Appl. No.: 506,640

[22] Filed: Jun. 22, 1983

[51] Int. Cl.³ .............................................. B60J 11/00
[52] U.S. Cl. ...................................... 296/136; 296/100
[58] Field of Search ................ 296/136, 100, 101, 98, 296/107, 109, 98 A; 160/19; 220/255; 150/52 K, 52 R; 135/88, 111, 904

[56] References Cited

U.S. PATENT DOCUMENTS

| | | | |
|---|---|---|---|
| 1,390,137 | 9/1921 | King | 296/136 |
| 2,620,007 | 12/1952 | Keller | 296/136 |
| 4,091,484 | 5/1978 | Means | 296/136 |

FOREIGN PATENT DOCUMENTS 74422  6/1952  Denmark ........................... 296/136

Primary Examiner—Robert B. Reeves
Assistant Examiner—Russell D. Stormer
Attorney, Agent, or Firm—Paul H. Ware

[57] ABSTRACT

A vehicle cover foldably storable in a storage case attached to the vehicle and unfoldably deployable to cover the vehicle so that the outside surface of the cover does not come in contact with the inside surface that may be in direct contact with the vehicle.

1 Claim, 14 Drawing Figures

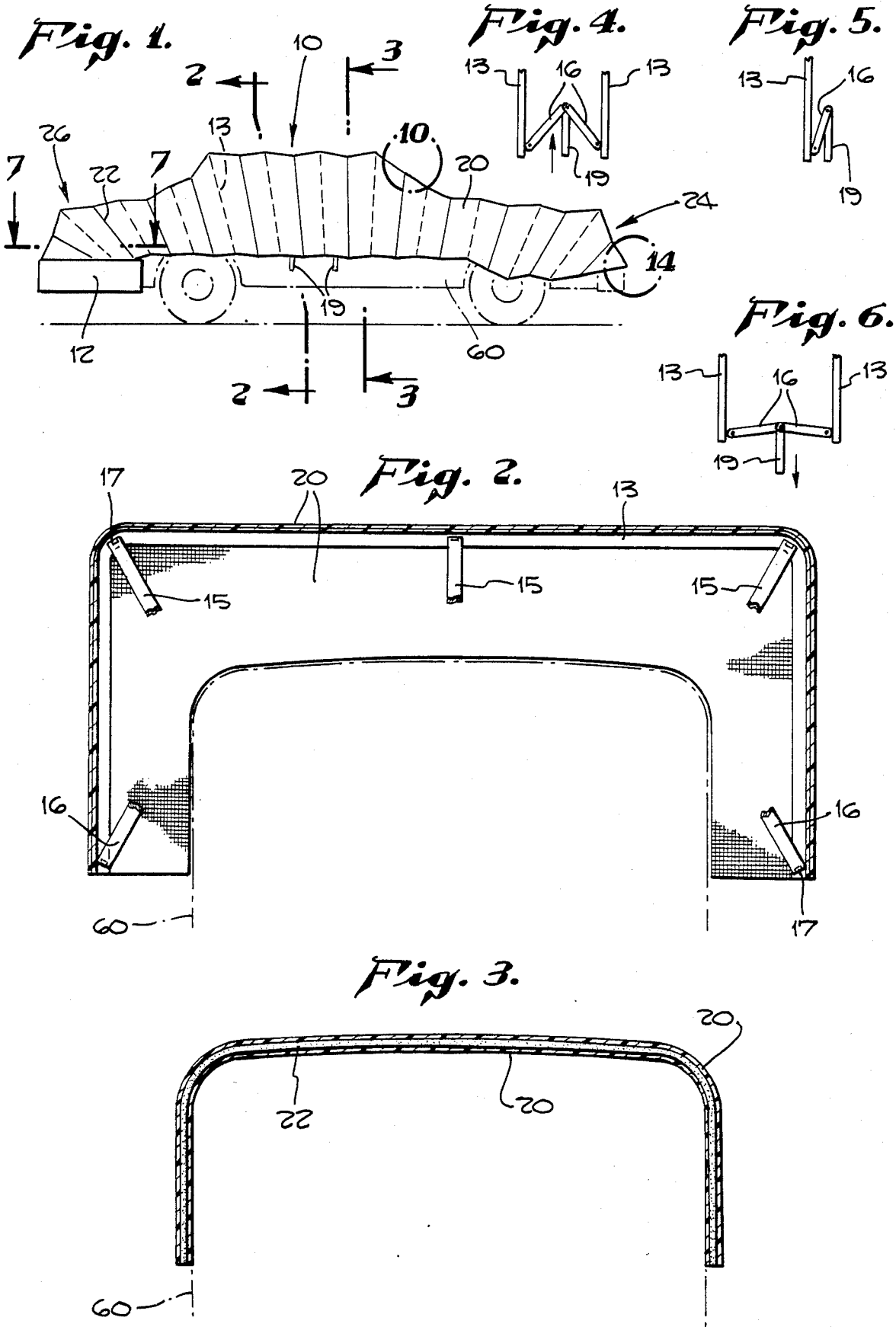

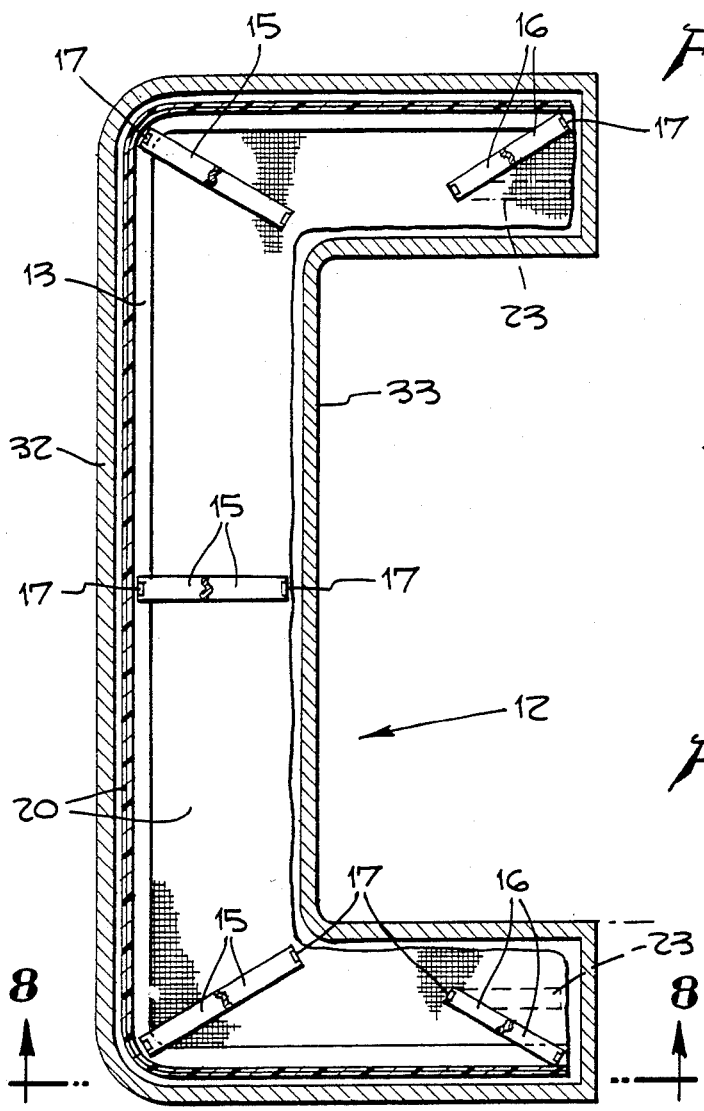
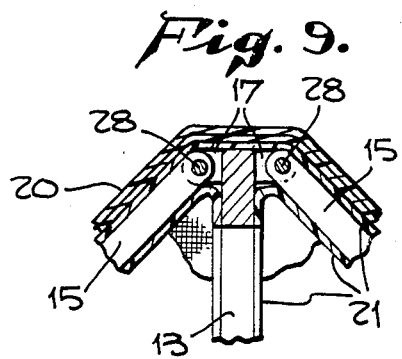
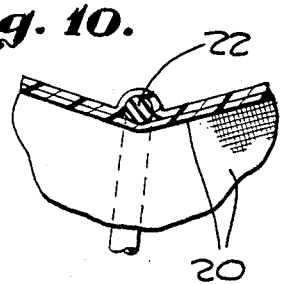
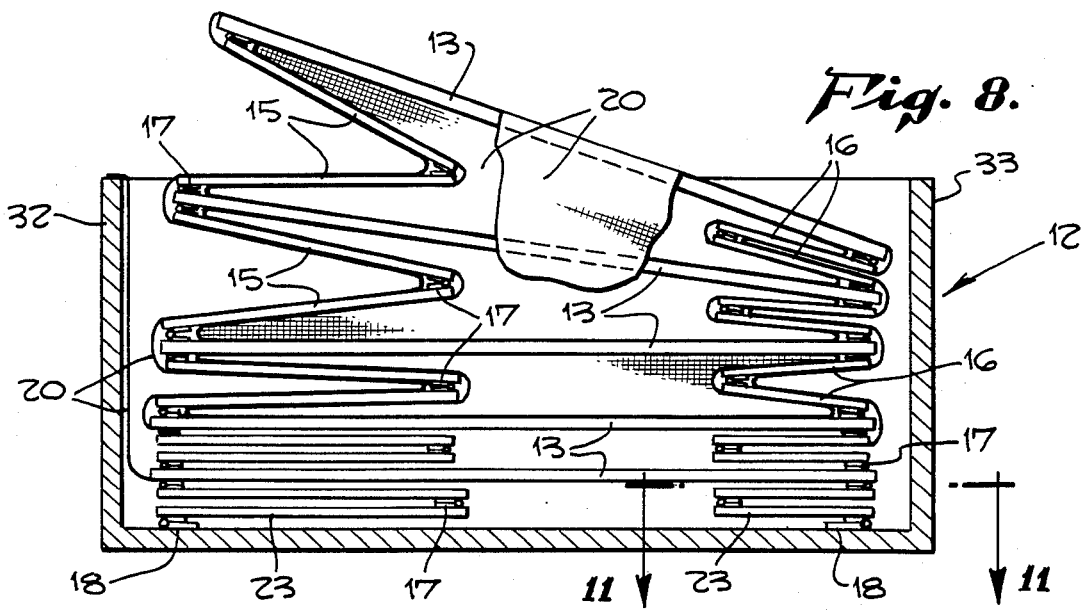

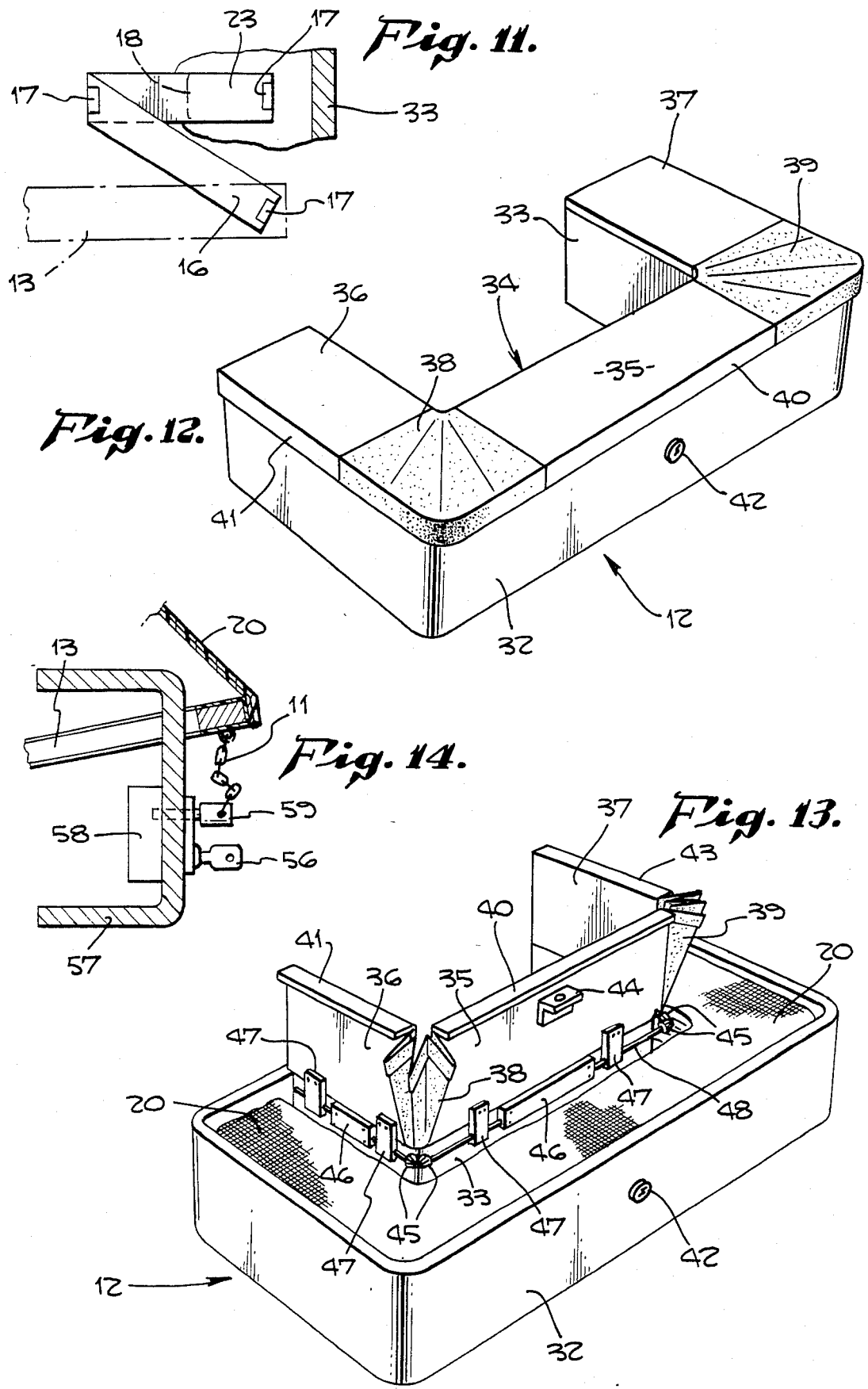

FOLDABLE VEHICLE COVER STORABLE ON THE VEHICLE

BACKGROUND OF THE INVENTION

1. Field of the Invention

This invention relates generally to vehicle covers and more particularly to a vehicle cover that may be secured to a vehicle for storage when not deployed to cover the vehicle.

2. Description of the Prior Art

Vehicle covers are known that may be secured to the vehicle for storage when not in use, however, many of these prior art devices suffer from disadvantages that have been successfully attacked and overcome by the present invention. For example, some of the prior art covers are wound up on rollers for storage in such fashion that the outer surface of the cover contacts the inner surface thus both surfaces become soiled if one, usually the outer surface, first becomes soiled. When the inner surface becomes soiled, then the vehicle itself becomes soiled by the very cover that purports to protect it. In some of the prior art devices the sides of the vehicle are covered by separately deployed side panels that may be subject to flapping about when subjected to a breeze. Some of the prior art devices on the other hand, make no provision for covering the sides of the covered vehicles.

Many different vehicle covers have been employed in the attempts to solve the problems presented. Most have either presented new problems or only partially solved the problems presented, or both. Most of these devices have thus met special needs as presented by specific problems and have therefore served narrow purposes. These prior art devices, among other disadvantages, have caused unacceptable soiling of the vehicle to be protected, have been unreliable and unpredictable in operation under continued use and have been expensive and complicated to manufacture. Some of these prior art devices have been described in the following listed patents that were brought to the attention of the applicant through a novelty search conducted in the United States Patent and Trademark office:

| List of Reference Patents | | |
|---|---|---|
| U.S. Pat. No. | Title | Inventor |
| 3,222,102 | Vehicle Cover | James W. Lucas |
| 2,688,513 | Power Operated Vehicle Cover | Ernest J. Poirier |
| 1,719,055 | Combination Bumper Container, Tent and Car Cover | John H. Herzer |
| 2,723,156 | Self Positioning Auto Cover | Victor Stanziale |
| 4,324,427 | Automobile Bumper with Adiabatic Device | Vincent P. W. Huang et al |

It would thus be a great advantage to the art to provide a vehicle cover, the inside of which did not become soiled by the means provided for storage thereof.

A further desirable advantage would be realized by the provision of a vehicle cover that covers the sides of the vehicle in a positive manner.

SUMMARY OF THE INVENTION

It is an object of the present invention to provide a vehicle cover such that the interior surface that contacts the vehicle does not come in contact with the exterior surface.

A still further object of the present invention is to provide an easily deployable vehicle cover that protects the top and sides of the vehicle.

In the accomplishment of these and other objects, a vehicle cover is provided in which the cover is folded for storage rather than wound upon a roller. Additionally, the sides of the cover are maintained under tension so that the side coverings are not subject to flapping in a breeze.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 1 is a side elevation showing the vehicle cover deployed so as to cover a vehicle.

FIG. 2 is a cross-sectional view taken along the sight lines 2—2 of FIG. 1.

FIG. 3 is a cross-sectional view taken along the sight lines 3—3 of FIG. 1.

FIG. 4 is an idealized fragmentary drawing showing the joining of C-frame members with bottom fold arms and a central pull member.

FIG. 5 is a side elevation of the construction shown in FIG. 4.

FIG. 6 shows the structure illustrated in FIG. 4 fully extended.

FIG. 7 is a plane view showing the vehicle cover stored in its storage compartment.

FIG. 8 is a cross-sectional view taken along the sight lines 8—8 of FIG. 7.

FIG. 9 is a detail drawing showing the covering fabric as attached to frame members and a method of connecting folding members by means of hinges.

FIG. 10 is a detail drawing taken from FIG. 1 where indicated by the section circle 10.

FIG. 11 is an enlarged detail drawing of forward folding assembly members showing how they fold as taken along sight lines 11—11 of FIG. 8.

FIG. 12 is a perspective drawing of the vehicle cover container showing its cover in place.

FIG. 13 is a perspective drawing of the vehicle cover container showing its cover opened in preparation for deployment of the vehicle cover.

FIG. 14 illustrates how the vehicle cover may be secured to a bumper when deployed taken from FIG. 1 where indicated by the sight circle 14.

DETAILED DESCRIPTION

Although specific embodiment of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring to FIG. 1 with greater particularity, the vehicle cover 10 is illustrated generally as deployed to cover a vehicle 60. Sight lines 2—2, 3—3 and section circles 10 and 14 refer to later figures that illustrate the mechanism of the invention in finer detail.

FIG. 2, taken along section sight lines 2—2 of FIG. 1, shows how one of the C-frame members 13 is covered by the covering fabric 20. Top fold arms 15 and bottom fold arms 16 are shown in fragment. The locations of hinges 17 is indicated, however, details of hinges 17 are presented in a later FIGURE. The broken line indicates in general the cross-sectional outline of the covered vehicle 60.

FIG. 3, an illustration taken as viewed along section sight lines 3—3, shows how one of the elastomeric tensioning members 22 is covered by fabric 20. Tensioning members 22 may be of rubber or other elastomeric resilient material. Again, vehicle outline is indicated by the broken line.

FIGS. 4, 5 and 6 show how the C-frames 13 of the C-frame assembly may be interconnected, for example, by hingeing. In FIG. 4, the C-frame assembly to bottom fold arms 16 is shown as the interconnection of transverse members 13 and bottom fold arms 16 by hinges. The structure is shown as only partially extended. Central pull member 19 is shown as hinged to the common connection of bottom fold arms 16. FIG. 5 is a side view of FIG. 4, the interconnected parts being the same while FIG. 6 shows the same C-frame assembly fully extended.

FIG. 7 presents a plan view in cross section showing part of the cover assembly as stored in its storage case 12. Storage case 12 is depicted in cross section as a C-shaped trough such that the folded vehicle cover may be contained therein when C-frame members 13 have been placed therein by means of the hinged folding of top fold arms 15 and bottom fold arms 16 by means of hinges 17. Innermost surface 33 denotes that part of storage case 12 in closer proximity to the vehicle while the outermost surface 32 is the part of the storage case cover that becomes the extreme rear of the vehicle.

FIG. 8 shows the vehicle cover in its case 12 from the vantage point of the sight lines 8—8 of FIG. 7. The fabric 20 has been cut away in part so that the mechanism of the frame assembly may be shown, leaving only a fragment of the fabric 20. The hinged members 13 being the rigid C-frame members, are shown as interconnected by the hinges 17 with top fold arms 15 and bottom fold arms 16. The fold arms adjacent the bottom of storage case 12 are denoted by the numeral 23 and are attached thereto by means of hinges 18. Auto top covering fabric additionally attaches to one of the top fold arms so as to completely weatherproof the assembly when the cover is deployed.

FIG. 9 shows an enlarged detail drawing of hinge 17 as attached to fold arms 15 and rigid C-frame member 13 by means of hinge pins 28.

FIG. 10 shows detail of the fabric covered elastomeric tensioning members 22 as viewed from the vantage point of section circle 10 of FIG. 1.

FIG. 11 is an enlargement of detail of the forward folding assembly as viewed by means of sight lines 11—11 of FIG. 8.

FIGS. 12 and 13 are perspective views of the C-shaped trough storage case 12 showing in FIG. 12, the case top 34 closed in place. Storage case 12 has an outermost surface 32 adapted to be covered by case top 34 which has a central portion 35, a first side top portion 36, a second side top portion 37 and first and second flexible top portions 38 and 39 respectively. Central portion 35 has a central portion top lip 40 while first side top portion 36 has a first side portion top lip 41 and second side top portion 37 has a second side portion top lip 43. Central portion 35 is interconnected with side top portions 36 and 37 by means of bevel gears 45 in such manner that raising of central portion 35 causes side top portions 36 and 37 to raise also so as to assume positions with their near edges perpendicular to central portion 35. Raising central portion 35 preparatory to deploying the vehicle cover additionally causes accordion-like folding of first and second flexible top portions 38 and 39 as shown in FIG. 13. Additionally, a latch 44 may operate cooperatively with a keyhole 42 and key 56 (FIG. 14) to secure the vehicle cover in its case and also when deployed on the vehicle as shown in FIG. 14. FIG. 14 additionally ilustrates a lock mechanism 58 not detailed, which may be adapted to a bumper 57 of the vehicle in cooperation with a locking post 59 and security chain 11. A first elongated shaft 48 extends lengthwise of the length of central portion 35. Bevel gears 45 are fixedly attached at each end of shaft 48. A fixed bearing block 46 secures the shaft to the inside of innermost surface 33. Two pivoted bearings 47 are attached to the shaft 48 and to the inside surface of central portion 35 so that the central portion is rotatably connected to the storage case 12. Two additional elongated shafts each extend lengthwise of the lengths of the first and second side top portions 36 and 37 respectively. Each additional shaft is then secured by means of fixed bearing blocks 46 to respective sides of innermost surface 33 as appropriately shown in FIG. 13 for first side top portion 36. Pivoted bearings 47 serve the same purpose of rotatably connecting the side top portions to the inside of innermost surface 33. Meshing bevel gears are provided at the appropriate ends of the associated side portion elongated shafts so that when the central portion 35 is raised, side top portions 36 and 37 are also raised through the interaction of bevel gear assembly 45. It should be apparent that flexible top portions 38 and 39 must now assume flexed configurations in response to the movements of the top portions 35, 36 and 37. As illustrated a latch 44 operable in cooperation with a lock having a keyhole 42 may be provided for security when the vehicle cover is to be stored in storage case 12. Upon deployment to cover the vehicle, the bumper 57 of the covered vehicle may be modified so as to provide an exemplary locking means comprising, for example, a lock mechanism 58, operable in cooperation with a locking post 59 and security chain 11 and key 56.

Thus, there has been described a vehicle cover that provides for storage upon the very vehicle it is meant to cover. Because of the way the device of the invention is folded for storage, the outer surface of the cover does not come in contact with the inner surface, thus, the inner surface is not subject to soilage by a soiled outer surface which may become soiled, for example, by bird droppings, mud or the like. Deployment is easy and once deployed, the cover can be secured to prevent theft just as the case containing the cover when undeployed can be locked against would-be thieves.

It is pointed out that although the present invention has been shown and described with reference to particular embodiment, nevertheless various changes and modifications, obvious to one skilled in the art to which the invention pertains, are deemed to lie within the purview of the invention.

What is claimed and desired to be secured by Letters Patent of the United States is:

1. A vehicle cover unfoldably deployable and foldably storable, comprising:
- a plurality of rigid C-frame members having top and bottom ends;
- a storage case for containing said C-frame members, said storage case being C-shaped and comprising:
  - an outermost surface having a bottom portion;
  - a case top for covering the top of said outermost surface wherein said case top is C-shaped, comprising:
    - a central portion;
    - a first side portion;
    - a first flexible portion joining said central portion and said first side portion;
    - a second side portion;
    - a second flexible portion joining said central portion and said second side portion;
  - wherein said central portion, said first side portion, said first flexible portion, said second side portion and said second flexible portion each have a lip portion that fits over said outermost surface in an overlapping manner;
  - an innermost surface joining said outermost surface and said case top to make a closed container;
  - wherein said case top also includes an opening and closing mechanism comprising:
- a first elongated shaft extending lengthwise of the length of said central portion and distal from said lip portion thereof and attached to the inside of said inner surface of said storage case by means of a fixed bearing block;
- at least one pivoted bearing mounted upon said first shaft and fixedly secured to said central portion so that said central portion may rotate upwardly from said storage case;
- a second elongated shaft extending lengthwise of the length of said first side portion and distal from said lip portion thereof and attached to the inside of said innermost surface of said storage case by means of a fixed bearing block;
- at least one pivoted bearing mounted upon said second shaft and fixedly secured to said first side portion so that said first side portion may rotate upwardly from said storage case;
- a third elongated shaft extending lengthwise of the length of said second side portion and distal from said lip portion thereof and attached to the inside of said innermost surface of said storage case by means of a fixed bearing block;
- at least one pivoted bearing mounted upon said third shaft and fixedly secured to said second side portion so that said second side portion may rotate upwardly from said storage case;
- a bevel gear at each end of said first elongated shaft;
- a meshing bevel gear at the appropriate end of said second elongated shaft meshing with the bevel gear at one end of said first elongated shaft;
- a meshing bevel gear at the appropriate end of said third elongated shaft meshing with the bevel gear at the other end of said first elongated shaft;
- so that when said central portion is rotated upwardly from said storage case, the interaction of the meshing bevel gears constrains said first side portion and said second side portion to rotate upwardly from said storage case and said first flexible portion and said second flexible portion to flex so as to permit such motion;
- a plurality of fold arms;
- a first plurality of hinges connecting said ends to said fold arms;
- a plurality of bottom fold arms;
- a second plurality of hinges connecting said bottom ends to said bottom fold arms;
- a plurality of C-shaped elastomeric tensioning members;
- covering fabric alternately attached to said plurality of rigid C-frame members and said plurality of C-shaped elastomeric tensioning members so as to form panels therebetween.

* * * * *